(12) United States Patent
Park et al.

(10) Patent No.: US 8,253,880 B2
(45) Date of Patent: Aug. 28, 2012

(54) CONTAINER FOR A DISPLAY DEVICE, METHOD OF MANUFACTURING THE SAME, AND DISPLAY DEVICE INCLUDING THE CONTAINER

(75) Inventors: Sang-Joon Park, Hwaseong-si (KR); Tae-Seok Kim, Suwon-si (KR); Il Kwon, Suncheon-si (KR); Soon-Woo Lee, Suncheon-si (KR); Yong-Soo Jeong, Suncheon-si (KR); Woo-Yul Chang, Seoul (KR); Yeong-Khy Ok, Suncheon-si (KR); Jeong-Tae Kim, Suncheon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 237 days.

(21) Appl. No.: 12/770,916

(22) Filed: Apr. 30, 2010

(65) Prior Publication Data

US 2010/0277405 A1    Nov. 4, 2010

(30) Foreign Application Priority Data

Apr. 30, 2009   (KR) ........................ 10-2009-0038004
Apr. 30, 2009   (KR) ........................ 10-2009-0038005

(51) Int. Cl.
*G02F 1/1333*   (2006.01)

(52) U.S. Cl. ............................................. 349/58; 349/56
(58) Field of Classification Search ............... 349/58–60
See application file for complete search history.

(56) References Cited

U.S. PATENT DOCUMENTS

| | | | |
|---|---|---|---|
| 7,157,850 B2* | 1/2007 | Miyazaki et al. | 313/495 |
| 2005/0082963 A1* | 4/2005 | Miyazaki et al. | 313/493 |
| 2006/0043510 A1* | 3/2006 | Yamazaki et al. | 257/432 |
| 2007/0085112 A1* | 4/2007 | Yamazaki et al. | 257/288 |
| 2007/0108886 A1* | 5/2007 | Miyazaki et al. | 313/495 |
| 2007/0145875 A1* | 6/2007 | Kim | 313/110 |
| 2010/0277405 A1* | 11/2010 | Park et al. | 345/92 |
| 2011/0242446 A1* | 10/2011 | Park et al. | 349/58 |

* cited by examiner

*Primary Examiner* — Rhonda Peace
(74) *Attorney, Agent, or Firm* — F.Chau & Associates, LLC

(57) ABSTRACT

In a container for a display device, a method of manufacturing the same, and a display device including the container, the container includes an inner layer including carbon of about 0.001 wt % to about 0.1 wt %, silicon of about 0.002 wt % to about 0.05 wt %, manganese of about 0.3 wt % to about 2 wt %, impurities of about 0.08 wt % to about 0.29 wt % based on a total weight of the inner layer and a remainder of iron, a plating layer formed on the inner layer and including electric zinc, and a polymer chrome-free layer formed on the plating layer. Thus, a weight and a thickness of the container may be reduced so that the container may have a light weight and a thin thickness.

20 Claims, 4 Drawing Sheets

| EXAMPLE 1 | EXAMPLE 2 | COMPARATIVE EXAMPLE 1 |
|---|---|---|
|  |  |  |
| FINE | FINE | FINE |

CONTAINER FOR A DISPLAY DEVICE, METHOD OF MANUFACTURING THE SAME, AND DISPLAY DEVICE INCLUDING THE CONTAINER

PRIORITY STATEMENT

This application claims priority under 35 U.S.C. §119 to Korean Patent Application No. 2009-38004 and No. 2009-38005, filed on Apr. 30, 2009 in the Korean Intellectual Property Office (KIPO), the contents of which are herein incorporated by reference in their entirety.

BACKGROUND OF THE INVENTION

1. Field of the Invention

Example embodiments of the present invention relate to a container for a display device, a method of manufacturing the container, and a display device including the container. More particularly, example embodiments of the present invention relate to a container for a display device having a thin thickness and a light weight, a method of manufacturing the container, and a display device including the container.

2. Description of the Related Art

A liquid crystal display device of a thin-film transistor type (TFT-LCD) is a kind of a flat display device, and the TFT-LCD displays an image via changing a liquid crystal and via controlling an amount of light passing through a polarizing plate. The TFT-LCD has low power consumption, a thin thickness, a light weight and a high resolution to be used in variable display devices including a laptop computer, a monitor of a desktop computer, a cellular phone, a television, a digital camera, etc.

The TFT-LCD includes a panel unit actually displaying an image, a backlight unit providing light to the panel unit, a top chassis and a bottom chassis. The panel unit displays the image using the light provided from the backlight unit.

The top chassis is combined with the bottom chassis to protect the panel unit and the backlight unit from surroundings of the display device. In addition, the panel unit is fixed to the backlight unit by the top chassis and the bottom chassis so that the bottom chassis prevents the panel unit from moving. For example, the bottom chassis receives and supports the backlight unit. Heat generated from a light source of the backlight unit is radiated to outside of the display device through the bottom chassis. In addition, the bottom chassis may ground the light source or shield electromagnetic wave. Thus, the bottom chassis needs to have characters such as a high strength, an electrical conductivity of a surface, a chemical resistance and a good machinability.

The bottom chassis is generally formed from a steel sheet. When the steel sheet is excessively thin, the bottom chassis may have a low strength. Thus, the thickness of the steel sheet may be equal to or greater than about 1 mm in order to have a sufficient strength, so that the bottom chassis is heavy and thick. In addition, the bottom chassis is vulnerable to fingerprints of workers or contaminants in assembling processes of the TFT-LCD.

SUMMARY OF THE INVENTION

Example embodiments of the present invention provide a container for a display device capable of improving mechanical and chemical properties and having a light weight and a thin thickness.

Example embodiments of the present invention also provide a method of manufacturing the container.

Example embodiments of the present invention also provide a display device including the container.

According to an example embodiment of the present invention, a container for a display device includes an inner layer, a plating layer and a polymer chrome-free layer. The inner layer includes carbon of about 0.001 wt % to about 0.1 wt %, silicon of about 0.002 wt % to about 0.05 wt %, manganese of about 0.3 wt % to about 2 wt %, impurities of about 0.08 wt % to about 0.29 wt % based on the total weight of the inner layer and a remainder of iron. The plating layer is formed on the inner layer. The polymer chrome-free layer is formed on the plating layer.

In an embodiment, the plating layer may be plated in a deposit amount of about 10 $g/m^2$ to about 30 $g/m^2$.

In an embodiment, the polymer chrome-free layer may include an amine-based resin of about 10 wt % to about 30 wt %, a silica mixture of about 10 wt % of about 50 wt %, an inorganic sol of about 1 w % to about 10 wt % based on the total weight of the polymer chrome-free layer and a remainder of an epoxy resin as a binder resin. In addition, the polymer chrome-free layer may be coated in a deposit amount of about 0.8 $g/m^2$ to about 1.3 $g/m^2$.

In an embodiment, a total thickness of the inner layer, the plating layer and the polymer chrome-free layer may be in a range of about 0.5 mm to about 0.9 mm.

According to another example embodiment of the present invention, a display device there is provided a method of manufacturing the container. In the method, a plating layer is formed on an inner layer including carbon of about 0.001 wt % to about 0.1 wt %, silicon of about 0.002 wt % to about 0.05 wt %, manganese of about 0.3 wt % to about 2 wt %, impurities of about 0.08 wt % to about 0.29 wt % based on the total weight of the inner layer and a remainder of iron. A polymer chrome-free layer is formed on the plating layer that is formed on the inner layer.

In an embodiment, the polymer chrome-free layer may be formed by coating a composition including an amine-based resin of about 10 wt % to about 30 wt %, a silica mixture of about 10 wt % of about 50 wt %, an inorganic sol of about 1 w % to about 10 wt % based on the total weight of the inner layer and a remainder of an epoxy resin as a binder resin on the plating layer.

In an embodiment, the plating layer may be formed in a sulfuric acid soak.

In an embodiment, the polymer chrome-free layer may be formed by one coating and one baking type process.

According to still another example embodiment of the present invention, a display device includes a panel unit, a backlight unit, a bottom chassis and a top chassis. The panel unit includes a first substrate having a thin-film transistor controlling a pixel and a second substrate facing the first substrate. The backlight unit generates light and provides the light to the panel unit. The bottom chassis receives the backlight unit and includes an inner layer, a plating layer and a polymer chrome-free layer. The inner layer includes carbon of about 0.001 wt % to about 0.1 wt %, silicon of about 0.002 wt % to about 0.05 wt %, manganese of about 0.3 wt % to about 2 wt %, impurities of about 0.08 wt % to about 0.29 wt % based on the total weight of the inner layer and a remainder of iron. The plating layer is formed on the inner layer and includes electric zinc. The polymer chrome-free layer is formed on the plating layer. The top chassis is combined with the bottom chassis to fix the panel unit to the backlight unit.

In an embodiment, the bottom chassis is electrically connected to a light source of the backlight unit.

According to the present invention, a weight and a thickness of the container are reduced so that the container has a light weight and a thin thickness.

Further, although the container has a thin thickness, the container may have a high strength and a contamination resistance against fingerprints of workers or contaminant in assembling processes of the display device. Furthermore, the container does not include chromium (Cr) to minimize an environmental contamination.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

Figure 1:
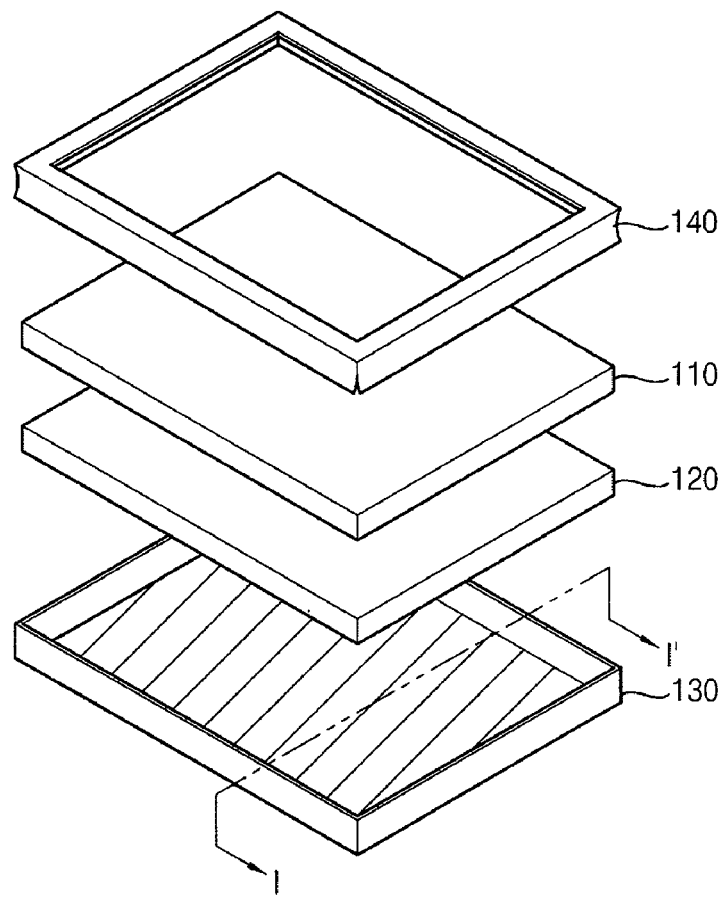
FIG. 1 is an exploded perspective view illustrating a display device according to an example embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, for manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is an exploded perspective view illustrating a display device according to an example embodiment of the present invention.

Referring to FIG. 1, a display device according to the present example embodiment includes a panel unit 110, a backlight unit 120, a bottom chassis 130 and a top chassis 140.

The panel unit 110 displays an image using light provided from the backlight unit 120. The panel unit 110 includes a first substrate having a thin-film transistor (TFT) as a switching element, a second substrate facing the first substrate, and a liquid crystal layer interposed between the first and second substrates. The second substrate may include a color filter. The TFT may control turning on or off of a pixel of the display device. The color filter may represent red (R), green (G) or blue (B). Alternatively, the color filter may be formed on the first substrate.

The backlight unit 120 generates light and is disposed under the panel unit 110 so that the backlight unit 120 provides the light to the panel unit 110. The backlight unit 120 may include a light source generating the light, an optical plate including a reflecting plate, a light guide plate or a diffusing plate, and optical sheets. The backlight unit 120 may have a light direct type structure to be disposed under a display panel of the backlight unit 120 and to directly face the light source. Alternatively, the backlight unit 120 may have an edge type structure to be disposed at a side of the display panel so that the light may be provided to the panel unit 110 via the light guide plate.

The bottom chassis 130 receives the backlight unit 120. The bottom chassis 130 includes a plating layer 220 (see FIG. 2) including electric zinc and a polymer chrome-free layer 230 (see FIG. 2). The bottom chassis 130 is electrically connected to the light source of the backlight unit 120 and inner circuits to ground the backlight unit 120.

The top chassis 140 is combined with the bottom chassis 130 to protect the backlight unit 120 from surroundings of the display device. In addition, the panel unit 110 is fixed to the backlight unit 120 by the top chassis 140 and the bottom chassis 130 so that the bottom chassis 130 may prevent the panel unit 110 from moving in the display device. The top chassis 140 may surround a peripheral region of the panel unit 110, which surrounds a display region of the panel unit 110 displaying an image, and a side region of the panel unit 110, and the top chassis 140 may expose the display region.

Figure 2:
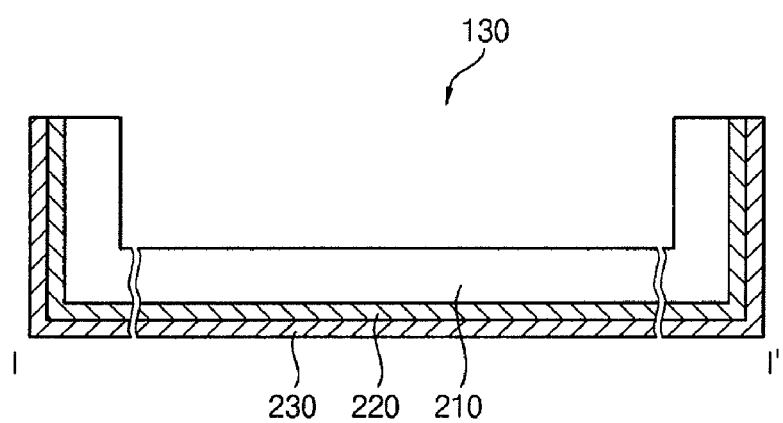
FIG. 2 is a cross-sectional view illustrating a bottom chassis taken along a line I-I' in FIG. 1.

FIG. 2 is a cross-sectional view illustrating a bottom chassis taken along a line I-I' in FIG. 1.

Referring to FIG. 2, the bottom chassis 130 includes an inner layer 210 serving as a base substantially defining a shape of the bottom chassis 130, a plating layer 220 and a polymer chrome-free layer 230.

The inner layer 210 includes carbon (C), silicon (Si), manganese (Mn), impurities, and iron (Fe) as the remainder of the inner layer 210 excluding carbon, silicon, manganese and the impurities. An amount of carbon of the inner layer 210 is about 0.001 wt % (% by weight) to about 0.1 wt % based on a total weight of the inner layer 210. An amount of silicon of the inner layer 210 is about 0.002 wt % to about 0.05 wt % based on the total weight of the inner layer 210. An amount of manganese of the inner layer 210 is about 0.3 wt % to about 2.0 wt % based on the total weight of the inner layer 210. An amount of the impurities of the inner layer 210 may be about 0.08 wt % to about 0.29 wt % based on the total weight of the inner layer 210. An amount of iron of the inner layer 210 may be substantially equal to a value subtracted an amount of carbon, silicon, manganese and the impurities from the total weight of the inner layer 210. The amount of iron of the inner layer 210 may be about 97 wt % to about 99.7 wt % based on the total weight of the inner layer 210.

Carbon of the inner layer 210 may enhance a strength of the inner layer 210. When an amount of carbon is less than about 0.001 wt %, the strength enhancement of the inner layer 210 may be insufficient. When an amount of carbon is greater than about 0.1 wt %, weldability and ductility of the inner layer 210 may be deteriorated. Thus, an amount of carbon is preferably about 0.001 wt % to about 0.1 wt % based on the total weight of the inner layer 210.

Silicon may enhance a solid-solution strength of the inner layer 210. When an amount of silicon is less than about 0.002 wt %, the solid-solution strength of the inner layer 210 may be reduced. When an amount of silicon is greater than about 0.05 wt %, an interface oxidation layer is formed on the inner layer 210 so that a surface quality of the inner layer 210 may be reduced.

Manganese may enhance a strength and a machinability of the inner layer 210. When an amount of manganese is less than about 0.3 wt %, it may be difficult to enhance the strength and the machinability of the inner layer 210. When an amount of manganese is greater than about 2.0 wt %, the inner layer 210 may have heterogeneity of an organization of the inner layer 210 by segregation. Thus, an amount of manganese is preferably about 0.3 wt % to about 2.0 wt % based on the total weight of the inner layer 210.

Examples of the impurities may include phosphorous (P), sulfur (S), chromium (Cr), nickel (Ni), molybdenum (Mo), aluminum (Al), copper (Cu), tin (Sn), oxygen (O), nitrogen (N), niobium (Nb), or titanium (Ti), etc. For example, the inner layer 210 may include phosphorous (P) of about 0 wt % to about 0.1 wt %, sulfur (S) of about 0 wt % to about 0.008 wt %, chromium (Cr) of about 0.01 wt % to about 0.03 wt %, nickel (Ni) of about 0.007 wt % to about 0.015 wt %, molybdenum (Mo) of about 0.001 wt % to about 0.004 wt %, aluminum (Al) of about 0.043 wt % to about 0.045 wt %, copper (Cu) of about 0.02 wt % to about 0.04 wt %, tin (Sn) of about 0.0017 wt % to about 0.0018 wt %, oxygen (O) of about 0 wt % to about 0.004 wt %, and nitrogen (N) of about 0 wt % to about 0.003 wt % based on the total weight of the inner layer 210. The inner layer 210 may further include niobium (Nb) of about 0.0075 wt % to about 0.0083 wt % and titanium (Ti) of about 0.0306 wt % to about 0.0310 wt % based on the total weight of the inner layer 210. Reasons for adding the impurities are widely known, and thus any particular descriptions will be omitted.

The plating layer 220 is formed on the inner layer 210. In particular, the plating layer 220 is formed on an outer surface of the inner layer 210, which is opposite to an inner surface of the inner layer 210 adjacent to the backlight unit 120. The plating layer 220 includes electric zinc. The plating layer 220 may be plated in a deposit amount of about 10 g/m2 to about 30 g/m2. Preferably, the plating layer 220 is plated in a deposit amount of about 20 g/m2 in a sulfuric acid soak.

The polymer chrome-free layer 230 is formed on the plating layer 220. Therefore, the plating layer 220 is disposed between the polymer chrome-free layer 230 and the inner layer 210. The polymer chrome-free layer 230 may prevent the bottom chassis 130 from being contaminated. In the present example embodiment, the polymer chrome-free layer 230 includes a polymer resin and excludes chromium (Cr). For example, the polymer chrome-free layer 230 may include an amine-based resin of about 10 wt % to about 30 wt %, a silica mixture of about 10 wt % of about 50 wt %, an inorganic sol of about 1 w % to about 10 wt % based on the total weight of the polymer chrome-free layer 230 and a remainder of an epoxy resin as a binder resin.

The amine-based resin is cross-linked so that the polymer chrome-free layer 230 obtains an adhesive strength. When an amount of the amine-based resin is less than about 10 wt %, the adhesive strength may be reduced. When an amount of the amine-based resin is greater than about 30 wt %, a machinability of the polymer chrome-free layer 230 may be reduced. Thus, an amount of the amine-based resin is preferably about 10 wt % to about 30 wt % based on a total weight of the polymer chrome-free layer 230.

The silica mixture may enhance a storage stability, an adherence, a corrosion resistance, and a machinability of the polymer chrome-free layer 230. When an amount of the silica mixture is less than about 10 wt %, a conductivity of the polymer chrome-free layer 230 may be reduced. When an amount of the silica mixture is greater than about 50 wt %, the a machinability of the polymer chrome-free layer 230 may be reduced. Thus, an amount of the silica mixture is preferably about 10 wt % to about 50 wt % based on a total weight of the polymer chrome-free layer 230.

The silica mixture may include a silica compound and a silane compound mixed with each other in a predetermined weight ratio. For example, the silica compound may include colloidal silica or fumed silica, etc., and the silane compound may include glycidoxypropylethoxysilane aminopropyl ethoxysilane or methoxyoxypropyl trimethoxysilane. The silica compound and the silane compound are mixed in a weight ratio of about 1:0.2 to about 1:0.8. When the weight ratio of the silica compound to the silane compound is less than about 1:0.2, a cross-linkability of the silica compound may be reduced. When the weight ratio of the silica compound and the silane compound is greater than about 1:0.8, a machinability of the polymer chrome-free layer 230 may be reduced.

The inorganic sol may enhance an adherence and a corrosion resistance of the polymer chrome-free layer 230. For example, the inorganic sol may include zirconiasol, aluminasol, or titansol. These may be used each alone or in a combination thereof. When an amount of the inorganic sol is less than about 1 wt %, an effect of adding the inorganic sol may not be obtained. When an amount of the inorganic sol is greater than about 10 wt %, it may be difficult to form the polymer chrome-free layer 230 and the conductivity and the machinability of the polymer chrome-free layer 230 may be reduced, although the corrosion resistance of the polymer chrome-free layer 230 may be enhanced. Thus, an amount of the inorganic sol is preferably about 1 wt % to about 10 wt %.

The epoxy resin functions as a binder resin and may form a dense barrier layer. In addition, the epoxy resin has a resistance against corrosion factors including a salt or oxygen, etc. A hydroxyl group of the epoxy resin has a good adherence to a coated object, for example, the plating layer 220 formed on the inner layer 210, so that the corrosion resistance and the chemical resistance of the polymer chrome-free layer 230 may be enhanced.

The polymer chrome-free layer 230 is preferably coated in a deposit amount of about 0.8 g/m$^2$ to about 1.3 g/m$^2$. When a deposit amount of the polymer chrome-free layer 230 is less than about 0.8 g/m$^2$, a machinability of the polymer chrome-free layer 230 may be reduced so that it may be difficult to control the shape of the bottom chassis 130. When a deposit amount of the polymer chrome-free layer 230 is greater than about 1.3 g/m$^2$, a conductivity of the polymer chrome-free layer 230 may be reduced so that it may be difficult to ground the light source or circuits of the backlight unit 120. The polymer chrome-free layer 230 having a deposit amount of about 0.8 g/m$^2$ to about 1.3 g/m$^2$ may have a thickness of about 1 μm.

The bottom chassis 130 may have a thickness of about 0.5 mm to about 0.9 mm. When the thickness of the bottom chassis 130 is greater than about 0.9 mm, the plating layer 220 or the polymer chrome-free layer 230 may be easily formed, however, it is difficult to form the bottom chassis 130 having a thin thickness and a light weight. When the thickness of the bottom chassis 130 is less than about 0.5 mm, a thickness of the plating layer 220 and the polymer chrome-free layer 230 is relatively thin to reduce the corrosion resistance and the contamination resistance or a thickness of the plating layer 220 and the polymer chrome-free layer 230 is relatively thick so that the inner layer 210 has a thin thickness, and thus the strength of the bottom chassis 130 may be weak.

Hereinafter, a method of manufacturing the bottom chassis 130 according to the present invention will be illustrated, referring to FIG. 2.

First, the inner layer 210 is prepared. The inner layer 210 includes carbon of about 0.001 wt % to about 0.1 wt %, silicon of about 0.002 wt % to about 0.05 wt %, manganese of about 0.3 wt % to about 2 wt %, impurities of about 0.08 wt % to about 0.29 wt % based on the total weight of the inner layer 210 and a remainder of iron. The plating layer 220 is formed on an outer surface of the inner layer 210. The plating layer 220 may be formed in a sulfuric acid soak.

A polymer chrome-free composition may be coated on the plating layer 220 by one coating and one baking type process to form the polymer chrome-free layer 230. The polymer chrome-free composition may include a solution including a dissolved solid including an amine-based resin of about 10 wt % to about 30 wt %, a silica mixture of about 10 wt % of about 50 wt %, an inorganic sol of about 1 w % to about 10 wt % based on the total weight of the polymer chrome-free composition and a remainder of an epoxy resin as a binder resin in a solvent. The polymer chrome-free layer 220 may be cooled through a water cooling system or an air cooling system after baking the solution using heat.

The baking process is preferably performed at a temperature of about 140° C. to about 220° C. When a temperature of the baking process is less than about 140° C., a hardening of the amine-based resin is not perfectly performed so that a corrosion resistance and other properties of the polymer chrome-free layer 230 may be reduced. When a temperature of the baking process is greater than about 220° C., cracks may be easily formed, or yellowish phenomenon may easily appear in the polymer chrome-free layer 230.

Thus, a steel plate including the inner layer 210, the plating layer 220 and the polymer chrome-free layer 230 may be formed. The steel plate is processed to manufacture the bottom chassis 130 shown in FIG. 1.

Hereinafter, properties of samples manufactured according to the present invention will be evaluated and effects according to the present invention will be illustrated in detail. However, samples according to the present invention are merely examples of the present invention, and samples of the present invention are not to be construed as limiting thereof. In addition, those skilled in the art will readily appreciate that many modifications are possible in the example embodiments without materially departing from the novel teachings and advantages of the present invention, and thus any detail descriptions will be omitted.

MANUFACTURING EXAMPLES 1, 2 AND COMPARATIVE EXAMPLE 1

Inner layers having compositions illustrated in Table 1 were formed, and each of the inner layers was plated in a deposit amount of about 20 g/m$^2$ in a sulfuric acid soak to form a plating layer including electric zinc on each of the inner layers. After forming the plating layers, polymer chrome-free layers were formed on each of the plating layers by one coating and one baking type process in a deposit amount of about 1.0 g/m$^2$. After forming the polymer chrome-free layers, the polymer chrome-free layers were baked at a temperature of about 180° C. and cooled to manufacture Examples 1, 2 and Comparative Example 1.

TABLE 1

| section | | Inner layer of Example 1 (Unit: wt %) | Inner layer of Example 2 (Unit: wt %) | Inner layer of Comparative Example 1 (Unit: wt %) |
|---|---|---|---|---|
| Added element | C | 0.0013 | 0.0548 | 0.0168 |
| | Si | 0.0029 | 0.0062 | 0.0058 |
| | Mn | 0.3600 | 0.2810 | 0.1430 |
| | P | 0.0678 | 0.0141 | 0.0178 |
| | S | 0.0073 | 0.0046 | 0.0044 |
| | Cr | 0.0297 | 0.0112 | 0.0101 |
| | Ni | 0.0144 | 0.0073 | 0.0096 |
| | Mo | 0.0032 | 0.0017 | 0.0022 |
| | Al | 0.0432 | 0.0450 | 0.0375 |
| | Cu | 0.0351 | 0.0242 | 0.0111 |
| | Nb | 0.0079 | — | — |
| | Ti | 0.0308 | — | — |
| | Sn | 0.0017 | 0.0018 | 0.0014 |
| | O | 0.0032 | 0.0038 | 0.0040 |
| | N | 0.0015 | 0.0028 | 0.0019 |
| | Fe | 99.39 | 99.5415 | 99.7344 |

Evaluation of Mechanical Properties

A thickness, a yielding point (YP), a tensile stress (TS), an elongation ratio (El), a process hardening index (value "n") and a Lankford value (value "r") for each of Examples 1, 2 and Comparative Example 1 were measured. Obtained results are illustrated in Table 2.

TABLE 2

| section | thickness (unit: mm) | YP (Unit: MPa) | TS (Unit: MPa) | El (Unit: %) | n | R r-bar | Δr |
|---|---|---|---|---|---|---|---|
| Sample 1 | 0.810 | 215.5 | 374.3 | 40.75 | 0.241 | 1.76 | 0.01 |
| Sample 2 | 0.802 | 221.4 | 355.4 | 42.51 | 0.235 | 1.67 | −0.51 |
| Comparative Example 1 | 1.002 | 208.1 | 327.7 | 43.26 | 0.199 | 1.61 | 0.80 |

Referring to Table 2, although each of Examples 1 and 2 has a thickness of about 0.8 mm, which is about 80% of that of Comparative Example 1, the yielding point of Examples 1 and 2 is relatively greater than that of Comparative Example 1, and the tensile strength of Examples 1 and 2 is relatively greater than that of Comparative Example 1.

Experimental Evaluation for Castability and Results

An LDR (Limit Dome Ratio) test was performed for Examples 1, 2 and Comparative Example 1. Test results are illustrated in Table 3.

TABLE 3

| | Section | | | | | |
|---|---|---|---|---|---|---|
| | 108φ | 109φ | 110φ | 111φ | 112φ | 113φ |
| Sample 1 | ○ | ○ | ○ | ○ | ○ | X |
| Sample 2 | ○ | X | — | — | — | — |
| Comparative Example 1 | ○ | ○ | ○ | X | — | — |

In the LDR test, the higher a limited value is, the better a castability is. Referring to Table 3, a limited value of Example 1 is higher than that of Comparative Example 1.

Experimental Evaluation for Machinability and Results

For Examples 1, 2 and Comparative Example 1, a 90° V-bending test and a 180° U-bending test were performed. Test results are illustrated in FIGS. 3A and 3B.

Figure 3A:
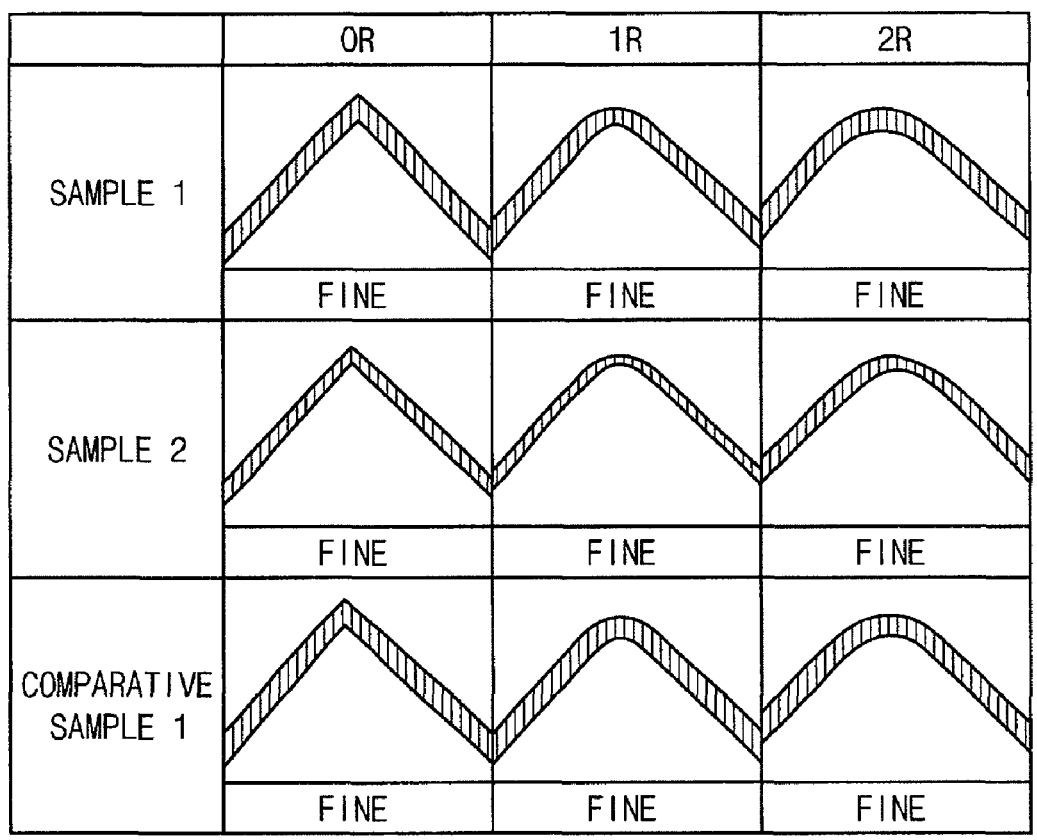
FIG. 3A illustrates a test result of 90° V-bending test for Examples 1 and 2 and Comparative Example 1.

FIG. 3A illustrates a test result of a 90° V-bending test for Examples 1 and 2 and Comparative Example 1. FIG. 3B illustrates a test result of a U-bending test for Examples 1 and 2 and Comparative Example 1.

Figure 3B:
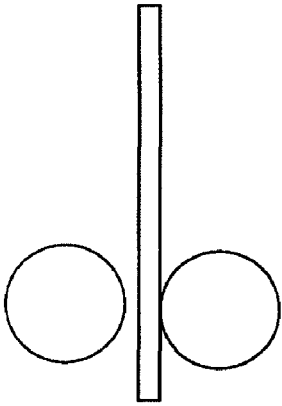
FIG. 3B illustrates a test result of U-bending test for Examples 1 and 2 and Comparative Example 1.
Figure 3B:
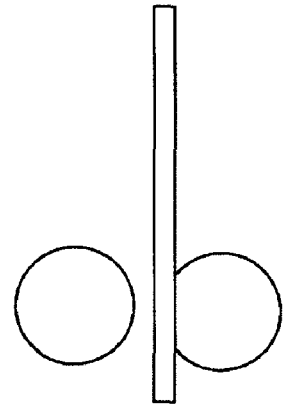
Figure 3B:
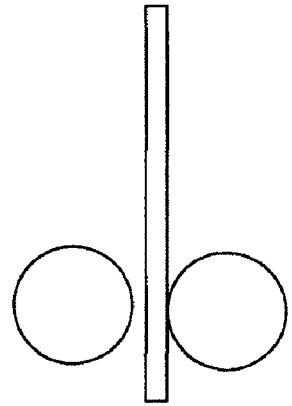

Referring to FIG. 3A, cracks are not formed in Examples 1, 2 and Comparative Example 1 in a 90° V-bending test according to 0R, 1R and 2R (R is a standard radius), Referring to FIG. 3B, cracks are not formed in Examples 1, 2 and Comparative Example 1 in a 180° U-bending test.

Evaluation of Other Properties

A corrosion resistance, a resistance to heat and humidity, a conductivity, a solvent resistance, an alkali resistance, a lubricative characteristic, a cold resistance, and a strong-alkali resistance for Examples 1, 2 and Comparative Example 1 were evaluated according to the following.

Experimental Evaluation for Corrosion Resistance

For each of Examples 1, 2 and Comparative Example 1, it was measured that 1) rust having white color was generated less than about 5% or not, 2) desquamation by a tape was generated or not, and 3) discoloration (allowable limit: when ΔE≦3, favorable) was generated or not. Experimental results are illustrated in Table 4.

Experimental Evaluation for Resistance to Heat and Humidity

For each of Examples 1, 2 and Comparative Example 1, it was measured that 1) each of rust, inflation and extraction was generated on their surfaces or not, 2) discoloration (allowable limit: when ΔE≦3, favorable) was generated on a naked plate and on stacked layers or not, and 3) desquamation by a tape was generated or not. Experimental results are illustrated in Table 4.

Experimental Evaluation for Conductivity

An electrical resistance was measured at 10 points on an entire surface of each of Examples 1, 2 and Comparative Example 1, and it was observed that equal to or more than about 7 points had an electrical resistance equal to or less than about 1 mΩ, or not.

Experimental Evaluation for Solvent (MEK) Resistance

For each of Examples 1, 2 and Comparative Example 1, it was measured that 1) inflation and desquamation were generated by methyl ethyl ketone (MEK) on their surfaces or not, and 2) discoloration (allowable limit: when ΔE≦1.0, favorable) was generated by the MEK or not. Experimental results are illustrated in Table 4.

Experimental Evaluation for Alkali Resistance

For each of Examples 1, 2 and Comparative Example 1, it was measured that 1) desquamation by a tape was generated or not, and 2) discoloration (allowable limit: when ΔE≦0.8, favorable) was generated or not. Experimental results are illustrated in Table 4.

Experimental Evaluation for Lubricative Characteristic

For each of Examples 1, 2 and Comparative Example 1, a coefficient of friction (favorable limit: about 0.07 to about 0.09) was measured, and it was measured that discoloration to black or white of friction surface (allowable limit: when ΔE≦0.8, favorable) was generated or not. Experimental results are illustrated in Table 4.

Experimental Evaluation for Cold Resistance

For each of Examples 1, 2 and Comparative Example 1, it was observed that rust having a white color was generated or not, and the plating layer was exposed by dissolving the resin or not. Experimental results are illustrated in Table 4.

Experimental Evaluation for Strong Alkali Resistance

For each of Examples 1, 2 and Comparative Example 1, it was observed that 1) desquamation and inflation were generated or not, and rust having red color was generated or not. Experimental results are illustrated in Table 4.

TABLE 4

| Section | | Example 1 | Example 2 | Comparative Example 1 |
|---|---|---|---|---|
| Corrosion resistance | Rust having white color | Rust less than 5% | Rust less than 5% | Rust less than 5% |
| | Tape desquamation | test OK | test OK | test OK |
| | ΔE | 0.83 | 1.04 | 1.06 |
| Resistance to heat and humidity | Surface | test OK | test OK | test OK |
| | ΔE | 1.75/1.57 | 1.75/1.49 | 1.88/1.89 |
| | Tape desquamation | test OK | test OK | test OK |
| Conductivity | | test OK | test OK | test OK |
| Solvent resistance | Desquamation | test OK | test OK | test OK |
| | ΔE | 0.35 | 0.22 | 0.53 |
| Alkali resistance | Tape desquamation | test OK | test OK | test OK |
| | ΔE | 0.30 | 0.11 | 0.10 |
| Lubricative characteristic | coefficient of friction | 0.0840 | 0.0850 | 0.0875 |
| | ΔE | 0.13 | 0.14 | 0.29 |
| Cold resistance | Rust having white color | test OK | test OK | test OK |
| | Depth of discoloration | 6~7 mm | 6~7 mm | 6~7.5 mm |
| Strong alkali resistance | Desquamation and rust having red color | test OK | test OK | test OK |

Referring to table 4, the corrosion resistance, the resistance to heat and humidity, and the conductivity, etc., of Examples 1 and 2 are substantially the same as those of Comparative Example 1.

As a result, the bottom chassis according to the present invention may have a thin thickness without reducing the mechanical properties, the machinability, the castability, the corrosion resistance. Thus, the bottom chassis may have a thin thickness and a light weight so that the display device including the bottom chassis may have a thin thickness and a light weight.

Figure 4:
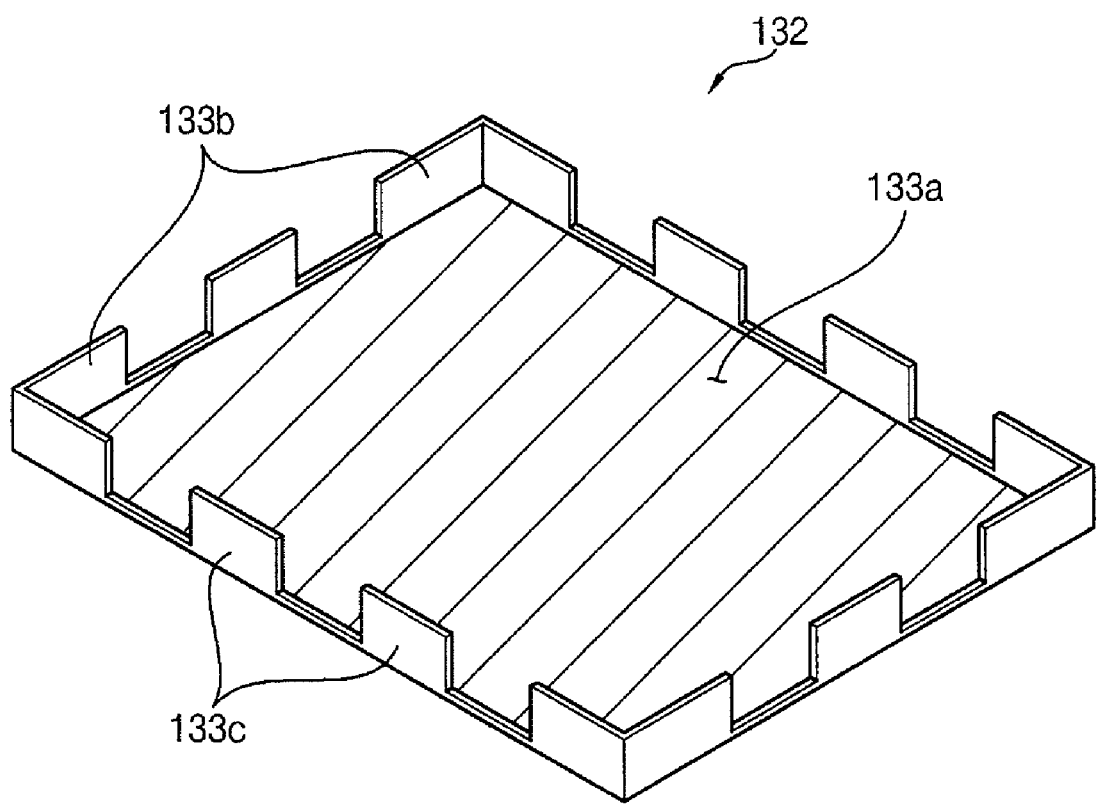
FIG. 4 is a perspective view illustrating a bottom chassis according to another example embodiment of the present invention.

FIG. 4 is a perspective view illustrating a bottom chassis according to another example embodiment of the present invention.

A bottom chassis 132 according to the present example embodiment is substantially the same as the bottom chassis 130 shown in FIG. 1 except for a shape of the bottom chassis 132. In addition, the bottom chassis 132 shown in FIG. 4 according to the present example embodiment is replaceable with the bottom chassis 130 shown in FIG. 1 to be used in the display device shown in FIG. 1. Thus, any repetitive descriptions will be omitted.

Referring to FIG. 4, the bottom chassis 132 includes a bottom portion 133a, first side walls 133b and second side walls 133c connected to the bottom portion 133a. The first and second side walls 133b and 133c may define as a receiving space of the bottom chassis 132 with the bottom portion 133a. When the bottom portion 133a has a quadrangle shape, the first side walls 133b may be disposed in regions corresponding to four corner portions of the bottom portion 133a and may have an L-shape. The second side walls 133c may be disposed in regions corresponding to four side portions of the bottom portion 133a. The second side walls 133c are spaced apart from each other between the first side walls 133b adjacent to each other.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A container for a display device, the container comprising:
    an inner layer including carbon of about 0.001 wt % to about 0.1 wt %, silicon of about 0.002 wt % to about 0.05 wt %, manganese of about 0.3 wt % to about 2 wt %, impurities of about 0.08 wt % to about 0.29 wt % based on a total weight of the inner layer and a remainder of iron;
    a plating layer formed on the inner layer and including electric zinc; and
    a polymer chrome-free layer formed on the plating layer.

2. The container of claim 1, wherein the plating layer is plated in a deposit amount of about 10 g/m$^2$ to about 30 g/m$^2$.

3. The container of claim 1, wherein the polymer chrome-free layer comprises an amine-based of about 10 wt % to about 30 wt %, a silica mixture of about 10 wt % to about 50 wt %, an inorganic sol of about 1 w % to about 10 wt % based on a total weight of the polymer chrome-free layer and a remainder of an epoxy resin as a binder resin.

4. The container of claim 3, wherein the silica mixture comprises a silica compound including at least one selected from the group consisting of a colloidal silica and fumed silica, and a silane compound including at least one selected from the group consisting of glycidoxypropylethoxysilane aminopropyl ethoxysilane, aminopropyl ethoxysilane and methoxyoxypropyl trimethoxysilane.

5. The container of claim 4, wherein the silica compound and the silane compound are mixed in a weight ratio of about 1:0.2 to about 1:0.8.

6. The container of claim 3, wherein the inorganic sol comprises at least one selected from the group consisting of zirconiasol, aluminasol, and titansol.

7. The container of claim 1, wherein the polymer chrome free layer is coated in a deposit amount of about 0.8 g/m² to about 1.3 g/m².

8. The container of claim 1, wherein the impurities comprises phosphorous (P) of about 0 wt % to about 0.1 wt %, sulfur (S) of about 0 wt % to about 0.008 wt %, chromium (Cr) of about 0.01 wt % to about 0.03 wt %, nickel (Ni) of about 0.007 wt % to about 0.015 wt %, molybdenum (Mo) of about 0.001 wt % to about 0.004 wt %, aluminum (Al) of about 0.043 wt % to about 0.045 wt %, copper (Cu) of about 0.02 wt % to about 0.04 wt %, tin (Sn) of about 0.0017 wt % to about 0.0018 wt %, oxygen (O) of about 0 wt % to about 0.004 wt %, and nitrogen (N) in of about 0 wt % to about 0.003 wt % based on a total weight of the impurities.

9. The container of claim 8, wherein the impurities further comprises niobium (Nb) of about 0.0075 wt % to about 0.0083 wt % and titanium (Ti) of about 0.0306 wt % to about 0.0310 wt % based on the total weight of the impurities.

10. The container of claim 1, wherein a total thickness of the inner layer, the plating layer and the polymer chrome-free layer is in a range of about 0.5 mm to about 0.9 mm.

11. A method of manufacturing a container for a display device, the method comprising:
    forming a plating layer on an inner layer including carbon of about 0.001 wt % to about 0.1 wt %, silicon of about 0.002 wt % to about 0.05 wt %, manganese of about 0.3 wt % to about 2 wt %, impurities of about 0.08 wt % to about 0.29 wt % based on a total weight of the inner layer and a remainder of iron; and
    forming a polymer chrome-free layer on the plating layer formed on the inner layer.

12. The method of claim 11, wherein the polymer chrome-free layer is formed by coating a composition including an amine-based resin of about 10 wt % to about 30 wt %, a silica mixture of about 10 wt % of about 50 wt %, an inorganic sol of about 1 w % to about 10 wt % based on a total weight of the polymer chrome-free layer and a remainder of an epoxy resin as a binder resin on the plating layer.

13. The method of claim 11, wherein the plating layer is formed in a sulfuric acid soak.

14. The method of claim 11, wherein the polymer chrome-free layer is formed by one coating and one baking type process.

15. The method of claim 11, wherein forming the polymer chrome-free layer further comprises:
    baking the polymer chrome-free layer at a temperature of about 140° C. to about 220° C.

16. A display device comprising:
    a panel unit including a first substrate having a thin-film transistor controlling a pixel and a second substrate facing the first substrate;
    a backlight unit generating light and providing the light to the panel unit;
    a bottom chassis receiving the backlight unit and including an inner layer, a plating layer and a polymer chrome-free layer, the inner layer including carbon of about 0.001 wt % to about 0.1 wt %, silicon of about 0.002 wt % to about 0.05 wt %, manganese of about 0.3 wt % to about 2 wt %, impurities of about 0.08 wt % to about 0.29 wt % based on a total weight of the inner layer and a remainder of iron, the plating layer being formed on the inner layer and including electric zinc, the polymer chrome-free layer being formed on the plating layer; and
    a top chassis combined with the bottom chassis to fix the panel unit to the backlight unit.

17. The display device of claim 16, wherein the plating layer is plated in a deposit amount of about 10 g/m² to about 30 g/m².

18. The display device of claim 16, wherein the polymer chrome-free layer comprises an amine-based resin of about 10 wt % to about 30 wt %, a silica mixture of about 10 wt % of about 50 wt %, an inorganic sol of about 1 w % to about 10 wt % based on a total weight of the polymer chrome-free layer and a remainder of an epoxy resin as a binder resin.

19. The display device of claim 16, wherein the polymer chrome-free layer is coated in a deposit amount of about 0.8 g/m² to about 1.3 g/m².

20. The display device of claim 16, wherein the bottom chassis is electrically connected to a light source of the backlight unit.

* * * * *